United States Patent
Sugime

(10) Patent No.: US 10,914,905 B2
(45) Date of Patent: Feb. 9, 2021

(54) PHOTOELECTRIC ADAPTERS AND OPTICAL TRANSMISSION CABLE CAPABLE OF RECEIVING AND OUTPUTTING ELECTRICITY

(71) Applicant: KYOCERA Corporation, Kyoto (JP)

(72) Inventor: Tomonori Sugime, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/876,123

(22) Filed: May 18, 2020

(65) Prior Publication Data

US 2020/0386957 A1     Dec. 10, 2020

(30) Foreign Application Priority Data

Jun. 6, 2019  (JP) ................................. 2019-105975

(51) Int. Cl.
    *G02B 6/42*     (2006.01)
    *H04B 10/25*    (2013.01)

(52) U.S. Cl.
    CPC ......... *G02B 6/4246* (2013.01); *G02B 6/4202* (2013.01); *H04B 10/25* (2013.01)

(58) Field of Classification Search
    CPC ..... G02B 6/4246; G02B 6/4202; H04B 10/25
    USPC ........................... 385/14, 53, 78, 88–92, 100
    See application file for complete search history.

(56) References Cited

U.S. PATENT DOCUMENTS

| | | | |
|---|---|---|---|
| 2007/0014321 A1* | 1/2007 | Shimotsu | H01S 5/02212 372/36 |
| 2017/0093501 A1 | 3/2017 | Meitl et al. | |
| 2020/0200363 A1* | 6/2020 | Harrison | H01S 5/02236 |

FOREIGN PATENT DOCUMENTS

JP        2010135989 A      6/2010

* cited by examiner

*Primary Examiner* — Michael P Mooney
(74) *Attorney, Agent, or Firm* — Hauptman Ham, LLP

(57) ABSTRACT

A photoelectric adapter includes a power sourcing equipment (PSE) device, an optical connector connection part and an electrical connector. The electrical connector is connectable to an electrical connector connection part of an electrical device. The PSE device includes a semiconductor laser that oscillates with electric power, thereby outputting feed light. The PSE device is driven by receiving the electric power supplied from the electrical device through the electrical connector, and outputs the feed light from the optical connector connection part. Another photoelectric adapter includes a powered device, an optical connector connection part and an electrical connector. The powered device includes a photoelectric conversion element that converts feed light into electric power. The powered device receives the feed light supplied through the optical connector connection part, converts the feed light into the electric power, and outputs the electric power from the electrical connector.

2 Claims, 6 Drawing Sheets

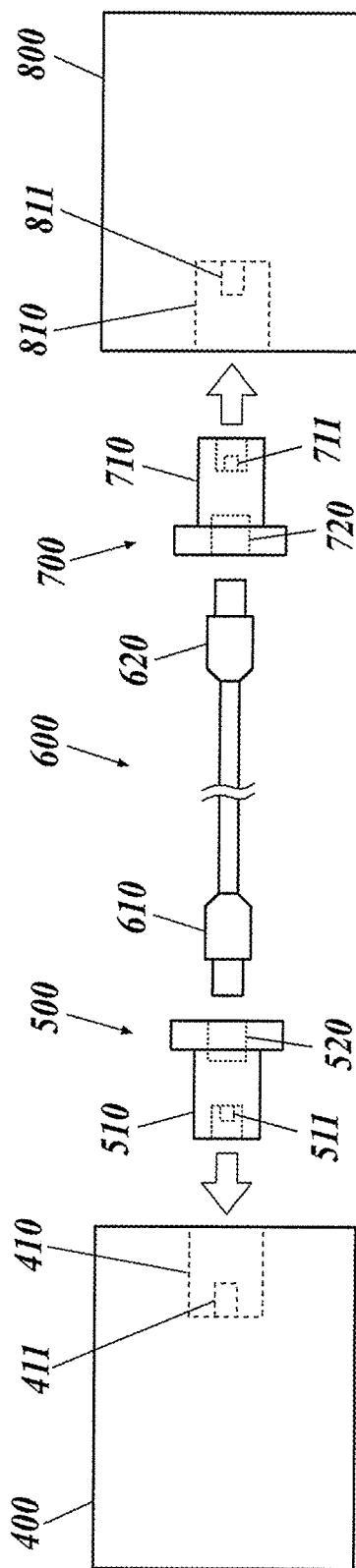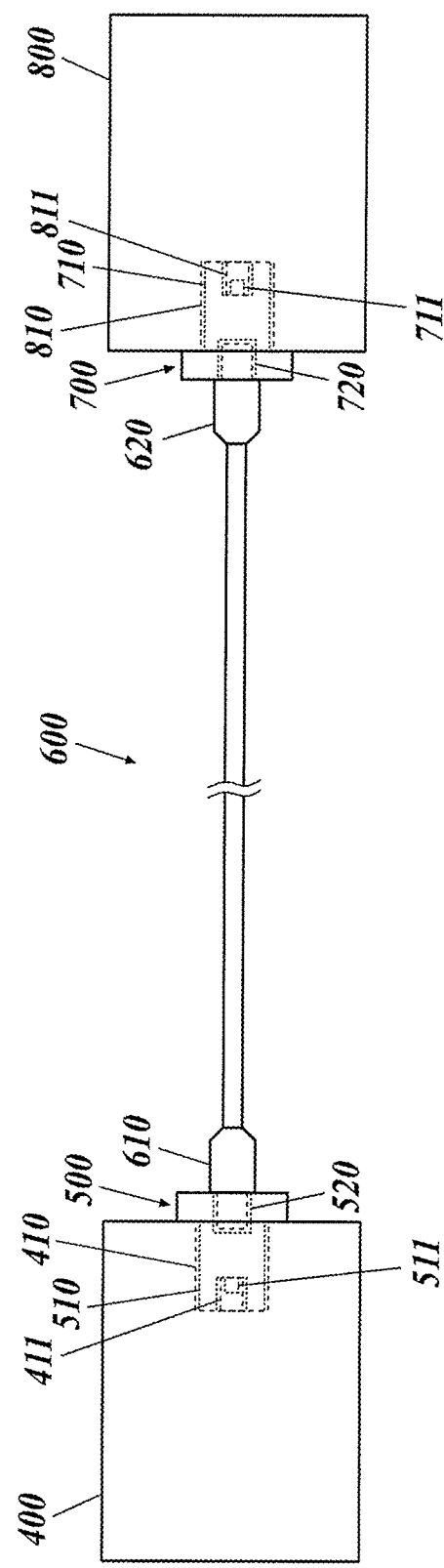

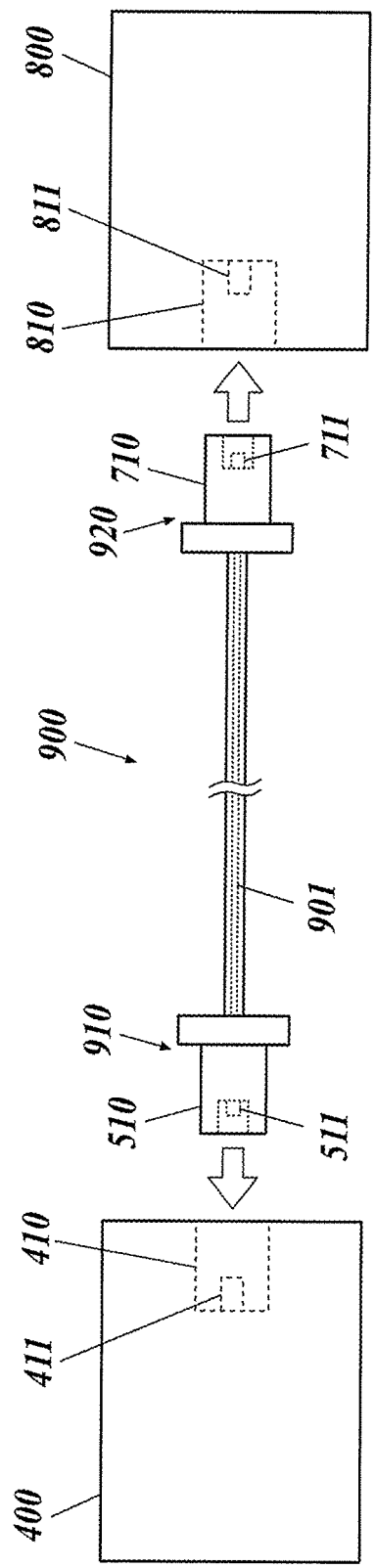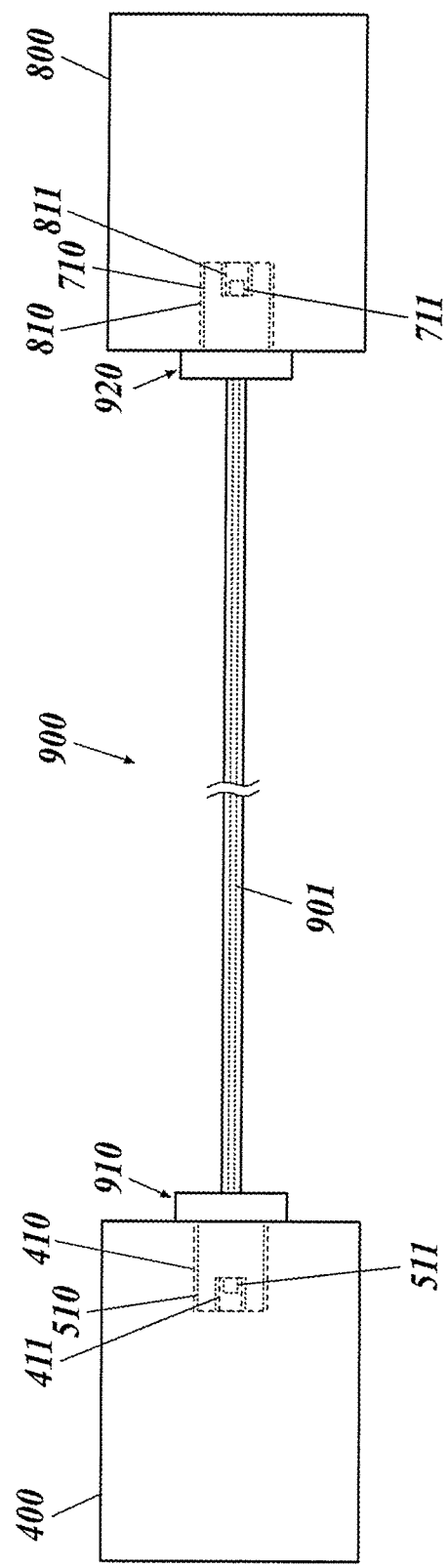

PHOTOELECTRIC ADAPTERS AND OPTICAL TRANSMISSION CABLE CAPABLE OF RECEIVING AND OUTPUTTING ELECTRICITY

CROSS-REFERENCE TO RELATED APPLICATIONS

This application is based upon and claims the benefit of priority from the prior Japanese Patent Application No. 2019-105975, filed on Jun. 6, 2019, the entire contents of which are incorporated herein by reference.

BACKGROUND

Technical Field

The present disclosure relates to optical power supply.

Description of Related Art

Recently, there has been studied an optical power supply system that converts electric power into light called feed light, transmits the feed light, converts the feed light into electric energy, and uses the electric energy as electric power.

There is disclosed in JP 2010-135989 A an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

SUMMARY

However, to electrical devices having a conventional electrical connection part but not an optical connection part, an optical fiber cable cannot be connected, and consequently an optical power supply system cannot be introduced.

According to a first aspect of the present disclosure, there is provided a photoelectric adapter including:

a power sourcing equipment device including a semiconductor laser that oscillates with electric power, thereby outputting feed light;

an optical connector connection part to which an optical connector is connectable; and an electrical connector that is connectable to an electrical connector connection part of an electrical device, wherein the power sourcing equipment device is driven by receiving the electric power supplied from the electrical device through the electrical connector, and outputs the feed light from the optical connector connection part.

According to a second aspect of the present disclosure, there is provided a photoelectric adapter including:

a powered device including a photoelectric conversion element that converts feed light into electric power;

an optical connector connection part to which an optical connector is connectable; and an electrical connector that is connectable to an electrical connector connection part of an electrical device, wherein the powered device receives the feed light supplied through the optical connector connection part, converts the feed light into the electric power, and outputs the electric power from the electrical connector.

According to a third aspect of the present disclosure, there is provided an optical transmission cable capable of receiving and outputting electricity, including:

a first electrical connector at a first end;

a second electrical connector at a second end;

an optical fiber in between;

at the first end, a power sourcing equipment device including a semiconductor laser that oscillates with electric power input through the first electrical connector, thereby outputting feed light to the optical fiber; and at the second end, a powered device including a photoelectric conversion element that converts the feed light transmitted through the optical fiber into electric power, and outputs the electric power from the second electrical connector.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 5 is a schematic diagram showing a power over fiber system using photoelectric adapters between two electrical devices, and shows configuration of the system before connecting the electrical devices;

FIG. 6 is a schematic diagram showing the power over fiber system using the photoelectric adapters between the two electrical devices, and shows configuration of the system after connecting the electrical devices;

FIG. 7 is a schematic diagram showing a power over fiber system using an optical transmission cable capable of receiving and outputting electricity between two electrical devices, and shows configuration of the system before connecting the electrical devices; and FIG. 8 is a schematic diagram showing the power over fiber system using the optical transmission cable between the two electrical devices, and shows configuration of the system after connecting the electrical devices.

DETAILED DESCRIPTION OF EMBODIMENTS

Hereinafter, one or more embodiments of the present disclosure will be described with reference to the drawings. However, the scope of the present invention is not limited to the disclosed embodiments or illustrated examples.

(1) Outline of System

First Embodiment

Figure 1:
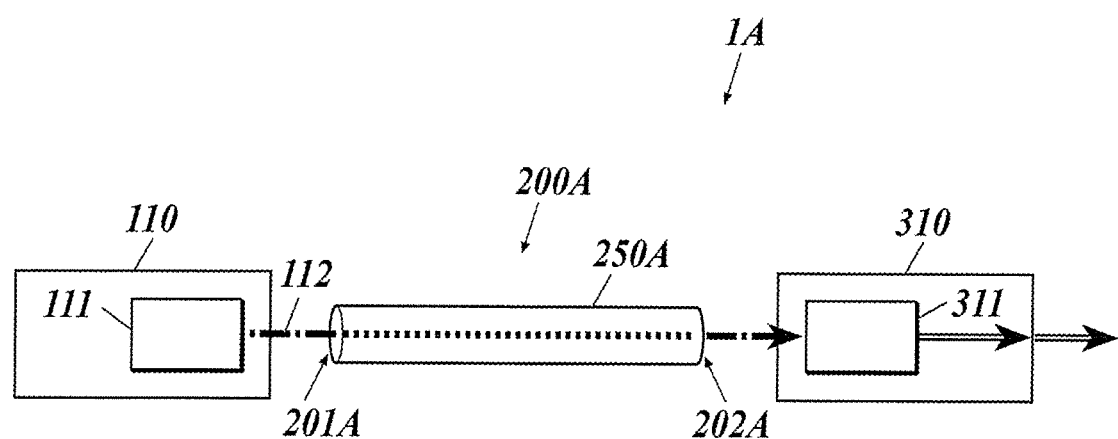
FIG. 1 is a block diagram of a power over fiber system according to a first embodiment of the present disclosure.

As shown in FIG. 1, a power over fiber (PoF) system 1A (optical power supply system) of this embodiment includes a power sourcing equipment (PSE) device 110, an optical fiber cable 200A and a powered device (PD) 310.

In the present disclosure, a PSE device converts electric power into optical energy and supplies (sources) the optical energy, and a powered device receives (draws) the supplied optical energy and converts the optical energy into electric power.

The PSE device 110 includes a semiconductor laser 111 for power supply.

The optical fiber cable 200A includes an optical fiber 250A that forms a transmission path of feed light.

The powered device 310 includes a photoelectric conversion element 311.

The PSE device 110 is connected to a power source, and electrically drives the semiconductor laser 111 and so forth.

The semiconductor laser 111 oscillates with the electric power from the power source, thereby outputting feed light 112.

The optical fiber cable 200A has one end 201A (first end) connectable to the PSE device 110 and the other end 202A (second end) connectable to the powered device 310 to transmit the feed light 112.

The feed light 112 from the PSE device 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side (PSE side) and the power receiving side (PD side) in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used, whereas when the photoelectric conversion efficiency is given priority, laser media having a laser wavelength (base wave) of less than 200 nm may be used.

Any of these semiconductor materials may be used in one of the semiconductor laser 111 and the photoelectric conversion element 311. This improves the photoelectric conversion efficiency at either the PSE side or the PD side, and improves the optical power supply efficiency.

Second Embodiment

Figure 2:
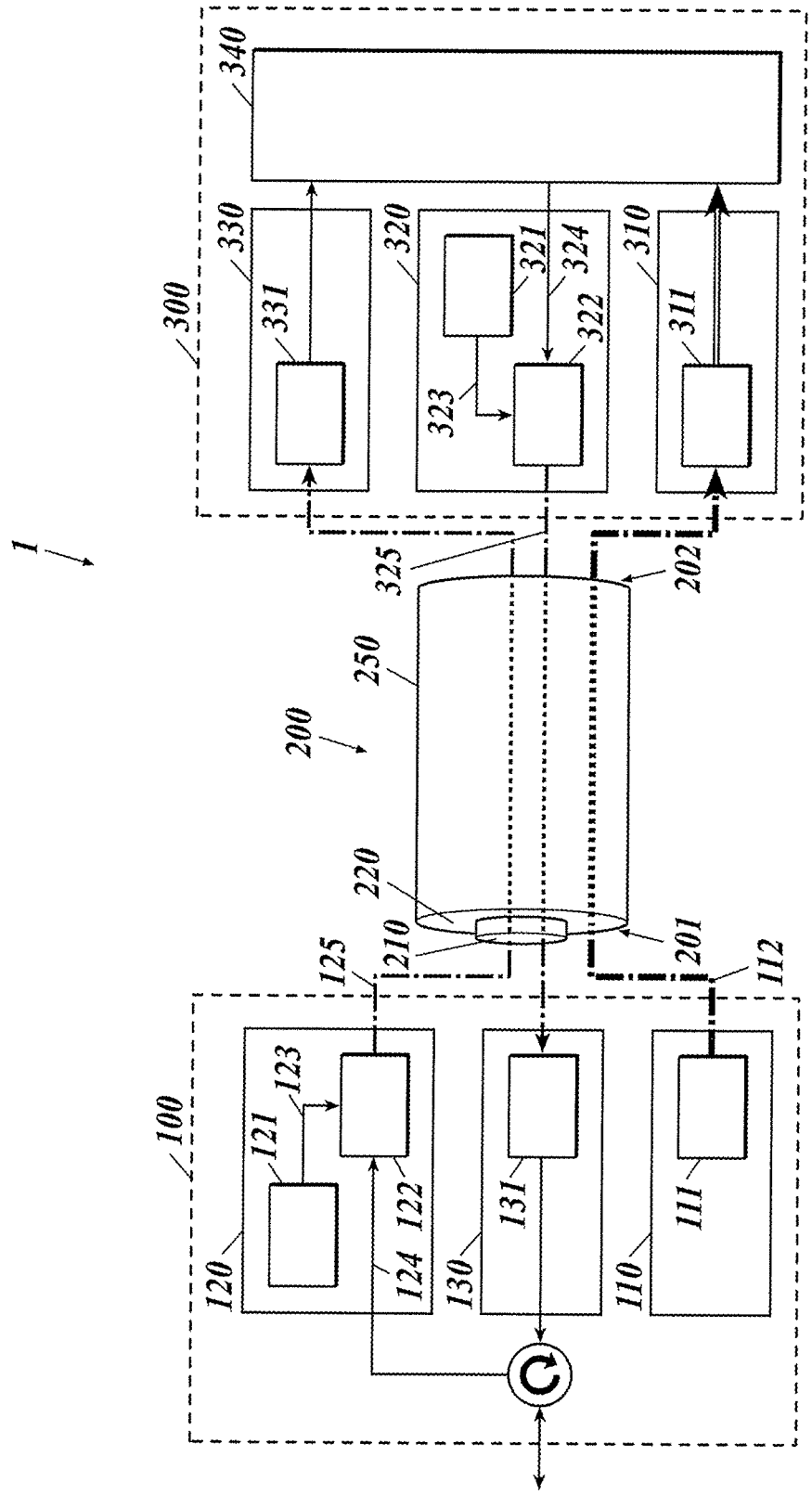
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) device 110; an optical fiber cable 200; and a second data communication device 300 including a powered device (PD) 310.

The PSE device 110 includes a semiconductor laser 111 for power supply. The first data communication device 100 includes, in addition to the PSE device 110, a transmitter 120 and a receiver 130 for data communication. The first data communication device 100 corresponds to a data terminal equipment (DTE) device, a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320 and a receiver 330 for data communication, and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 (first end) of the optical fiber cable 200, propagate through the cladding 220 and the core 210, respectively, and are output from the other end 202 (second end) of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
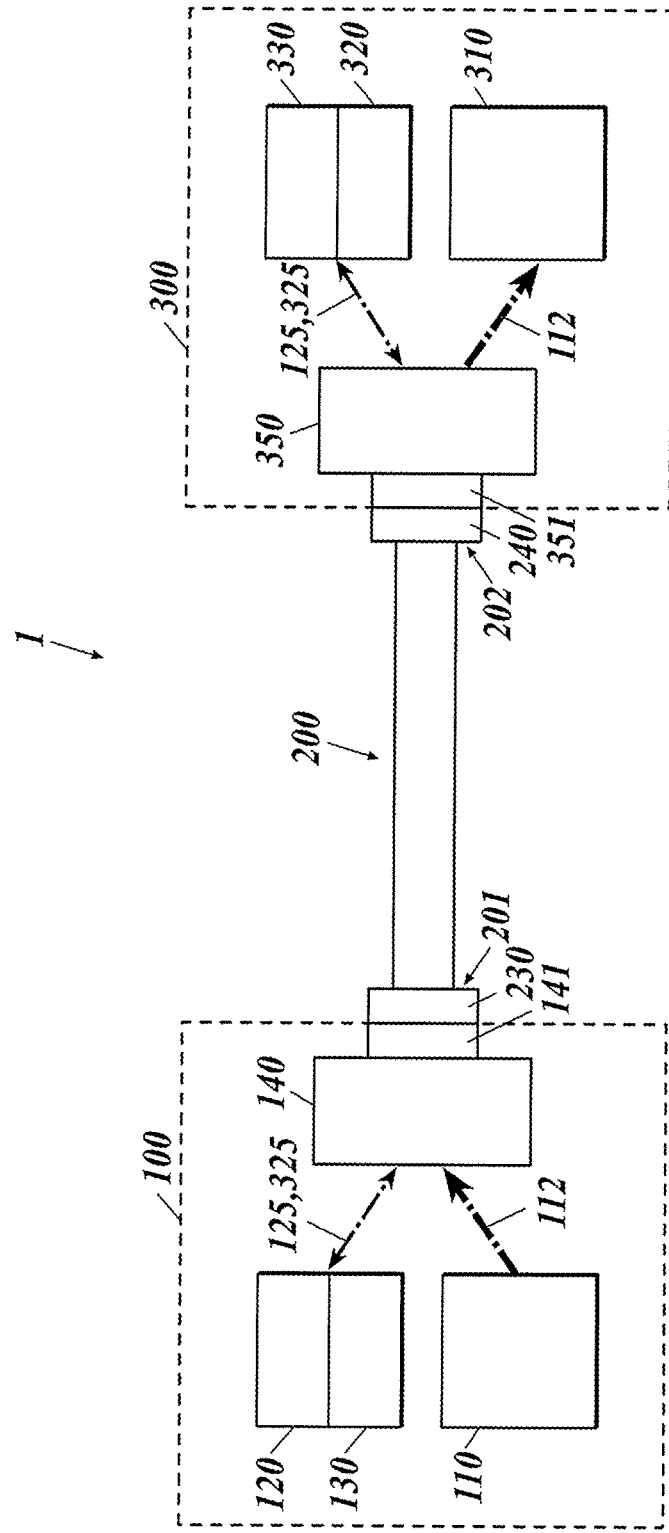
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125/325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
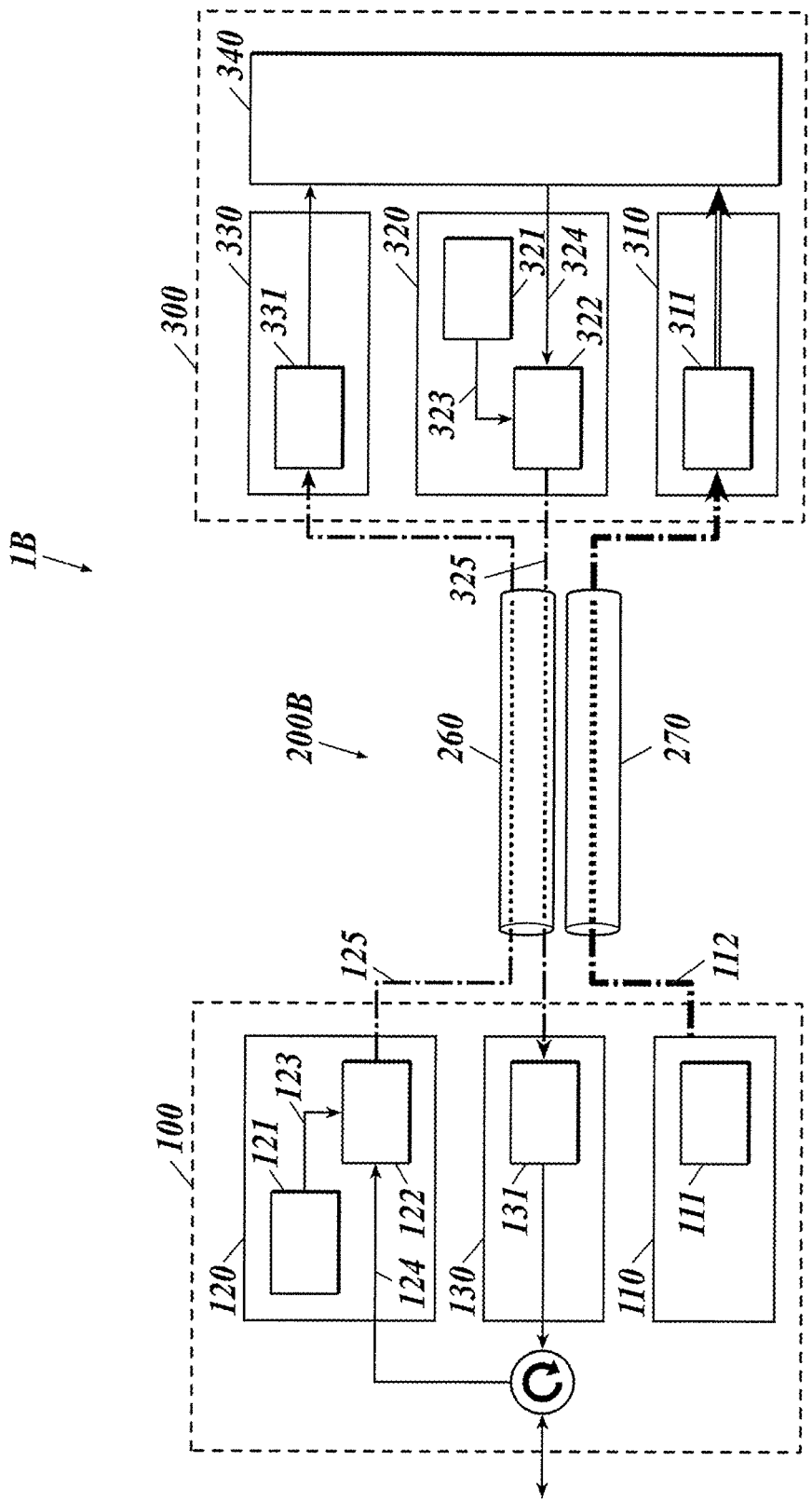
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Photoelectric Adapters

Next, how electrical devices are connected by using photoelectric adapters and an optical fiber cable will be described with reference to FIG. 5 and FIG. 6.

FIG. 5 shows configuration of a system before connecting electrical devices.

An electrical device 400 is an electrical device on the PSE side. The electrical device 400 includes an electrical connector connection part 410 having an electrode terminal 411. The electrical connector connection part 410 corresponds to, for example, a port for power supply and communication, such as a universal serial bus (USB) port.

An electrical device 800 is an electrical device on the PD side. The electrical device 800 includes an electrical connector connection part 810 having an electrode terminal 811. The electrical connector connection part 810 corresponds to, for example, a port for power receiving and communication, such as a universal serial bus (USB) port.

A photoelectric adapter 500 on the PSE side has the configuration of the first data communication device 100 described above, and integrally has an electrical connector 510 and an optical connector connection part 520.

The electrical connector 510 has an electrode terminal 511 that is brought into contact and thereby connected with the electrode terminal 411, thereby being connectable to the electrical connector connection part 410.

The optical connector connection part 520 is connectable to an optical connector 610 of an optical fiber cable 600. The optical fiber cable 600 corresponds to the optical fiber cable 200 described above.

A photoelectric adapter 700 on the PD side has the configuration of the second data communication device 300 described above, and integrally has an electrical connector 710 and an optical connector connection part 720.

The electrical connector 710 has an electrode terminal 711 that contacts and thereby is connected with the electrode terminal 811, thereby being connectable to the electrical connector connection part 810.

The optical connector connection part 720 is connectable to an optical connector 620 of the optical fiber cable 600.

FIG. 6 shows their connected state.

In the connected state shown in FIG. 6, the system operates as follows.

The photoelectric adapter 500 is driven by receiving electric power supplied from the electrical device 400 through the electrical connector 510, generates feed light by functioning similarly to the first data communication device 100 described above, and outputs the feed light from the optical connector connection part 520.

The feed light output from the optical connector connection part 520 is transmitted through the optical fiber cable 600 and input to the optical connector connection part 720 of the photoelectric adapter 700 on the PD side.

The photoelectric adapter 700 on the PD side receives the feed light supplied through the optical connector connection part 720, converts the feed light into electric power by functioning similarly to the second data communication device 300 described above, and outputs the electric power from the electrical connector 710.

The electric power output from the electrical connector 710 is input to the electrical device 800 through the electrical connector connection part 810.

Thus, the electrical device 800 can receive electric power supplied. That is, an optical power supply system can be introduced between the electrical device 400 and the electrical device 800.

Signal communication works as follows.

The photoelectric adapter 500 converts an electric signal input from the electrical device 400 through the electrical connector 510 into signal light by functioning similarly to the first data communication device 100 described above, and outputs the signal light from the optical connector connection part 520 to the optical fiber cable 600.

The photoelectric adapter 500 also converts signal light transmitted through the optical fiber cable 600 and input therefrom through the optical connector connection part 520 into an electric signal by functioning similarly to the first data communication device 100 described above, and outputs the electric signal from the electrical connector 510 to the electrical device 400.

The photoelectric adapter 700 converts an electric signal input from the electrical device 800 through the electrical connector 710 into signal light by functioning similarly to the second data communication device 300 described above, and outputs the signal light from the optical connector connection part 720 to the optical fiber cable 600.

The photoelectric adapter 700 also converts signal light transmitted through the optical fiber cable 600 and input therefrom through the optical connector connection part 720 into an electric signal by functioning similarly to the second data communication device 300 described above, and outputs the electric signal from the electrical connector 710 to the electrical device 800.

Thus, two-way communications between the electrical device 400 and the electrical device 800 can be performed.

(3) Optical Transmission Cable Capable of Receiving and Outputting Electricity

Next, how electrical devices are connected by using an optical transmission cable capable of receiving and outputting electricity will be described with reference to FIG. 7 and FIG. 8.

FIG. 7 shows configuration of a system before connecting electrical devices.

In the system described in the above (2), the optical fiber cable 600, the photoelectric adapter 500 and the photoelectric adapter 700 are separate components.

Meanwhile, an optical transmission cable 900 that is capable of receiving and outputting electricity, namely, to and from which electricity can be input and output, shown in FIG. 7 corresponds to a system in which the photoelectric adapter 500 and the photoelectric adapter 700 described in the above (2) are respectively fixed to one end and the other end of the optical fiber cable 600 described in the above (2) without the mechanisms for connection and separation.

That is, the optical transmission cable 900 has an electrical connector 510 (first electrical connector) and an electrical connector 710 (second electrical connector) at the respective ends and an optical fiber 901 in between.

The optical transmission cable 900 also has a PSE device at one end 910 (first end). The PSE device includes a semiconductor laser that oscillates with electric power input through the electrical connector 510 at the one end 910, thereby outputting feed light to the optical fiber 901.

The optical transmission cable 900 also has a powered device at the other end 920 (second end). The powered device includes a photoelectric conversion element that converts the feed light transmitted through the optical fiber 901 into electric power, and outputs the electric power from the electrical connector 710 at the other end 920.

The optical transmission cable 900 converts an electric signal input through the electrical connector 510 at the one end 910 into signal light, transmits the signal light through the optical fiber 901, reconverts the signal light into an electric signal, and outputs the electric signal from the electrical connector 710 at the other end 920.

The optical transmission cable 900 also converts an electric signal input through the electrical connector 710 at the other end 920 into signal light, transmits the signal light through the optical fiber 901, reconverts the signal light into an electric signal, and outputs the electric signal from the electrical connector 510 at the one end 910.

Thus, the system operates similarly to the system described in the above (2).

As compared with the system described in the above (2), this system has a simpler configuration with optical connectors eliminated. That is, although electrical connection points for connection and separation remain, optical connection points for connection and separation in the middle of optical transmission are eliminated. Electrical connection points can keep connection stability due to spring elasticity of electrode terminals even when the electrical connection points suffer disturbance, such as vibrations. On the other hand, when, for example, axis deviation of an optical transmission path occurs at an optical connection point, transmission loss may occur.

Further, when optical connectors are provided, dirt may be put on the light outgoing surfaces or the light receiving surfaces at optical connection points, and consequently optical transmission efficiency may drop. On the other hand, when the optical transmission cable 900 is used, such concern goes away.

As described above, when the optical transmission cable 900 is used, as connection points for connection and separation, only electrical connection points are present, and consequently signal transmission reliability and power supply efficiency can be kept at high levels.

Meanwhile, the system described in the above (2) can make use of an existing optical fiber cable(s), and consequently an optical power supply system can be introduced at low cost.

Although some embodiments of the present disclosure have been described above, these embodiments are made for purposes of illustration and example only. The present invention can be carried out in various other forms, and each component may be omitted, replaced or modified without departing from the scope of the present invention.

It is noted that use of an optical fiber(s) can provide lightning resistance, interference resistance and measures against noise.

A photoelectric adapter according to at least one embodiment of the present disclosure includes: a power sourcing equipment (PSE) device including a semiconductor laser that oscillates with electric power, thereby outputting feed light; an optical connector connection part to which an optical connector is connectable; and an electrical connector that is connectable to an electrical connector connection part of an electrical device, wherein the PSE device is driven by receiving the electric power supplied from the electrical device through the electrical connector, and outputs the feed light from the optical connector connection part.

A photoelectric adapter according to at least one embodiment of the present disclosure includes: a powered device including a photoelectric conversion element that converts feed light into electric power; an optical connector connection part to which an optical connector is connectable; and an electrical connector that is connectable to an electrical connector connection part of an electrical device, wherein the powered device receives the feed light supplied through the optical connector connection part, converts the feed light into the electric power, and outputs the electric power from the electrical connector.

An optical transmission cable capable of receiving and outputting electricity according to at least one embodiment of the present disclosure includes: a first electrical connector at a first end; a second electrical connector at a second end; an optical fiber in between; at the first end, a power sourcing equipment (PSE) device including a semiconductor laser that oscillates with electric power input through the first electrical connector, thereby outputting feed light to the optical fiber; and at the second end, a powered device including a photoelectric conversion element that converts the feed light transmitted through the optical fiber into electric power, and outputs the electric power from the second electrical connector.

Use of optical adapters or an optical transmission cable capable of receiving and outputting electricity according to at least one embodiment of the present disclosure can easily introduce an optical power supply system between electrical devices.

What is claimed is:

1. A photoelectric adapter, comprising:
   a power sourcing equipment device including a semiconductor laser that oscillates with electric power applied, thereby outputting feed light;
   an optical connector connection part to which an optical connector is connectable; and
   an electrical connector that is connectable to an electrical connector connection part of an electrical device,
   wherein the power sourcing equipment device is driven by receiving the electric power supplied from the electrical device through the electrical connector, and outputs the feed light from the optical connector connection part,
   wherein the photoelectric adapter converts an electric signal input from the electrical device through the electrical connector into signal light, and outputs the signal light from the optical connector connection part, and
   wherein the photoelectric adapter converts signal light input through the optical connector connection part into an electric signal, and outputs the electric signal from the electrical connector.

2. A photoelectric adapter, comprising:
   a power sourcing equipment device including a semiconductor laser that oscillates with electric power applied, thereby outputting feed light;
   an optical connector connection part to which an optical connector is connectable; and
   an electrical connector that is connectable to an electrical connector connection part of an electrical device,
   wherein the power sourcing equipment device is driven by receiving the electric power supplied from the electrical device through the electrical connector, and outputs the feed light from the optical connector connection part,
   wherein a semiconductor material of a semiconductor region of the semiconductor laser is a laser medium having a laser wavelength of 500 nm or less, the semiconductor region exhibiting a light-electricity conversion effect,
   wherein the photoelectric adapter converts an electric signal input from the electrical device through the electrical connector into signal light, and outputs the signal light from the optical connector connection part, and
   wherein the photoelectric adapter converts signal light input through the optical connector connection part into an electric signal, and outputs the electric signal from the electrical connector.

* * * * *